United States Patent
Nishida

(10) Patent No.: US 10,613,807 B2
(45) Date of Patent: Apr. 7, 2020

(54) IMAGE FORMING APPARATUS FOR CAUSING A SERVER TO PUSH PRINT SETTING SCREEN INFORMATION TO A TERMINAL

(71) Applicant: Konica Minolta, Inc., Tokyo (JP)

(72) Inventor: Masanori Nishida, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/037,571

(22) Filed: Jul. 17, 2018

(65) Prior Publication Data

US 2019/0026055 A1 Jan. 24, 2019

(30) Foreign Application Priority Data

Jul. 18, 2017 (JP) .................................. 2017-139322

(51) Int. Cl.
| | |
|---|---|
| *G06F 3/12* | (2006.01) |
| *G06F 3/041* | (2006.01) |
| *G06F 3/0488* | (2013.01) |

(52) U.S. Cl.
CPC .......... *G06F 3/1292* (2013.01); *G06F 3/0412* (2013.01); *G06F 3/0488* (2013.01); *G06F 3/122* (2013.01); *G06F 3/1204* (2013.01); *G06F 3/1208* (2013.01); *G06F 3/1228* (2013.01);
(Continued)

(58) Field of Classification Search
CPC .............................. G06F 3/1292; G06F 3/1253
See application file for complete search history.

(56) References Cited

U.S. PATENT DOCUMENTS

| | | | |
|---|---|---|---|
| 2004/0263870 A1* | 12/2004 | Itoh ....................... | G06F 3/1204 358/1.1 |
| 2009/0097062 A1* | 4/2009 | Hayashi ................ | G06F 3/1222 358/1.15 |

(Continued)

FOREIGN PATENT DOCUMENTS

| | | |
|---|---|---|
| EP | 1 489 488 A2 | 12/2004 |
| JP | 2017-21478 A | 1/2017 |

OTHER PUBLICATIONS

Extended European Search Report in counterpart European Application No. 18184127.1 dated Oct. 10, 2018 (10 pages).

*Primary Examiner* — Benjamin O Dulaney
(74) *Attorney, Agent, or Firm* — Osha Liang LLP

(57) ABSTRACT

An image processing system includes: an image forming apparatus; a terminal capable of transmitting a print job; a server that sends a push notification to the terminal based on identification information; a memory that stores the identification and terminal information in association with each other when the identification information is generated upon reception of permission of the push notification; and a CPU that: upon reception of the print job, extracts the terminal information from received data of the print job; designates the identification information associated with the extracted terminal information from stored information; generates information about a print setting screen based on the print job; and causes the push notification of the information about the print setting screen to be sent from the server to the terminal associated with the identification information based on the generated information about the print setting screen and the designated identification information.

20 Claims, 14 Drawing Sheets

(52) U.S. Cl.
CPC .......... *G06F 3/1237* (2013.01); *G06F 3/1253* (2013.01)

(56) References Cited

U.S. PATENT DOCUMENTS

| | | | |
|---|---|---|---|
| 2012/0182432 A1* | 7/2012 | Okamoto | G06F 3/1204 348/207.1 |
| 2013/0215464 A1* | 8/2013 | Kubo | G06K 15/40 358/1.15 |
| 2014/0132978 A1* | 5/2014 | Igawa | G06F 3/1207 358/1.14 |
| 2014/0139878 A1* | 5/2014 | Kadota | G06K 15/183 358/1.15 |
| 2015/0092233 A1* | 4/2015 | Park | G06F 3/1288 358/1.15 |
| 2015/0138582 A1* | 5/2015 | Ito | H04N 1/00925 358/1.13 |
| 2016/0011830 A1* | 1/2016 | Asakura | H04W 76/10 358/1.15 |
| 2016/0173709 A1* | 6/2016 | Kouno | H04N 1/00244 358/1.15 |
| 2016/0316100 A1* | 10/2016 | Hwang | G06F 3/1222 |
| 2017/0024173 A1* | 1/2017 | Iwamoto | G06F 3/1205 |
| 2017/0070642 A1* | 3/2017 | Miyamoto | B41J 29/38 |
| 2017/0078454 A1* | 3/2017 | Berookhim | G06K 9/00288 |
| 2017/0094104 A1* | 3/2017 | Fujiwara | G06F 3/1236 |
| 2017/0149985 A1* | 5/2017 | Nomura | G06F 3/1204 |
| 2017/0199710 A1* | 7/2017 | Ando | G06F 3/1222 |
| 2018/0091658 A1* | 3/2018 | Tsunekawa | H04N 1/0044 |
| 2018/0181352 A1* | 6/2018 | Saito | G06F 3/1205 |

\* cited by examiner

FIG.7

| ACCOUNT | IDENTIFICATION INFORMATION | TERMINAL INFORMATION | NOTIFICATION SETTING INFORMATION | |
|---|---|---|---|---|
| | | | PREVIEW | PRINT SETTING |
| UserA | TOKEN A | 100.100.101 | ON | ON |
| UserB | TOKEN B | 100.100.102 | OFF | ON |
| UserB | TOKEN C | 100.100.103 | ON | ON |
| UserC | TOKEN D | 100.100.104 | ON | OFF |
| UserD | TOKEN D | 100.100.104 | ON | OFF |
| ⋮ | ⋮ | ⋮ | ⋮ | ⋮ |

FIG.11

| SETTING ITEMS OF MFP | SETTING RANGE OF MFP | INITIAL SETTING OF MFP | PRINT JOB DETAILS | DISPLAY OF PRINT SETTING SCREEN |
|---|---|---|---|---|
| NUMBER OF COPIES | 1-100 | 1 | 5 | 5 |
| BOTH SIDES | ONE SIDE/BOTH SIDES | ONE SIDE | ONE SIDE (UNCHANGEABLE) | ONE SIDE |
| COLOR | MONOCHROME/GRAY SCALE/COLOR | MONOCHROME | MONOCHROME (UNCHANGEABLE) | MONOCHROME |
| PAPER SIZE | A4/A3/A5 | A4 | A4 (UNCHANGEABLE) | A4 |
| PAGE LAYOUT | NONE/2in1/4in1 | NONE | N/A (NOT APPLICABLE) | NONE |
| SECURITY PRINTING | OFF/ON | OFF | N/A (NOT APPLICABLE) | OFF |
| TRAY | 1-5 | 1 | N/A (NOT APPLICABLE) | 1 |
| STAPLE | OFF/ON | OFF | N/A (NOT APPLICABLE) | OFF |
| PUNCH | OFF/ON | OFF | N/A (NOT APPLICABLE) | OFF |

FIG.12

| DISPLAY OF PRINT SETTING SCREEN |
| --- |
| 1 |
| ONE SIDE |
| MONOCHROME |
| A4 |
| NONE |
| OFF |
| 1 |
| OFF |
| OFF |

FIG.13

| DISPLAY OF PRINT SETTING SCREEN |
| --- |
| 5(UNCHANGEABLE, SHOWN IN GRAY) |
| ONE SIDE |
| MONOCHROME |
| A4 |
| NONE |
| OFF |
| 1 |
| OFF |
| OFF |

FIG.14

| DISPLAY OF PRINT SETTING SCREEN |
|---|
| NON-DISPLAY |
| ONE SIDE |
| MONOCHROME |
| A4 |
| NONE |
| OFF |
| 1 |
| OFF |
| OFF |

IMAGE FORMING APPARATUS FOR CAUSING A SERVER TO PUSH PRINT SETTING SCREEN INFORMATION TO A TERMINAL

CROSS REFERENCE TO RELATED APPLICATIONS

The entire disclosure of Japanese Patent Application No. 2017-139322 filed on Jul. 18, 2017 is incorporated herein by reference in its entirety.

BACKGROUND

Technical Field

The present disclosure relates to an image processing system and an image forming apparatus, and particularly to an image processing system and an image forming apparatus, by which print settings can be done through a portable terminal.

Description of the Related Art

As a method for a user to issue a print execution instruction through a portable terminal such as a tablet or a smart phone to an image forming apparatus, there is a method of utilizing the OS (operating system)-standard printing function of the portable terminal. Also, as another method of issuing a print execution instruction through a portable terminal to an image forming apparatus, there is a method for a user to utilize an application that is specific to the image forming apparatus and installed in the portable terminal.

When the OS-standard printing function is used, it is advantageous for the user that an application does not need to be separately installed, but it is also disadvantageous that the type of settings about the printing process that can be set is limited. Accordingly, even when the user uses the OS-standard printing function, but when the user wishes to execute the print settings that cannot be done by the OS-standard printing function, the user has to execute the print settings by another method.

For example, Japanese Laid-Open Patent Publication No. 2017-21478 discloses an image forming system aiming to improve the operability in instructing an image forming apparatus to execute printing by utilizing the OS-standard printing function of the portable terminal, and then, executing the print settings by utilizing the application installed in this portable terminal.

However, in the method of utilizing an application, an application has to be installed in the portable terminal, so that the memory of the portable terminal has to be used. Furthermore, when the user utilizes a plurality of types of image forming apparatuses, the user has to install an application in the portable terminal for each type of image forming apparatus. Thereby, when the user utilizes a plurality of types of image forming apparatuses, the portable terminal has to use further more memories. When an application is installed in the portable terminal, the user not only has to install an application but also has to upgrade the version of the application installed in the portable terminal each time the version of the application is upgraded. Thus, excessive time and effort are required.

In this way, the method of utilizing an application is advantageous since detailed print settings can be done by utilizing the application, but time and effort are required in various ways.

SUMMARY

An image processing system and an image forming apparatus according to one or more embodiments of the present invention can readily utilize the print setting function of the image forming apparatus.

An image processing system according to one or more embodiments of the present invention comprises: an image forming apparatus or image former (any apparatus that forms an image such as a printer) that forms an image based on a print job; a terminal capable of transmitting the print job; a server that sends a push notification to the terminal based on identification information allowing identification of the terminal; a memory for storing the identification information and terminal information of the terminal in association with each other when the identification information of the terminal is generated based on permission of a push notification to the terminal; an extractor that, upon reception of the print job transmitted from the terminal, extracts the terminal information of the terminal from received data of the print job; a designator that designates the identification information associated with the terminal information from information stored in the memory based on the terminal information extracted by the extractor; a generator that generates information about a print setting screen of the image former based on the print job; and a notifier that performs a process for sending a push notification of the information about the print setting screen from the server to the terminal associated with the identification information based on the information about the print setting screen generated by the generator and the identification information designated by the designator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is a diagram for illustrating setting information stored for each account according to one or more embodiments of the present invention.

FIG. 11 is a diagram illustrating display details of print setting items displayed on the portable terminal according to one or more embodiments of the present invention.

FIG. 12 is a diagram showing a modification of display details of print setting items displayed on the portable terminal according to one or more embodiments of the present invention.

FIG. 13 is a diagram showing a modification of display details of print setting items displayed on the portable terminal according to one or more embodiments of the present invention.

FIG. 14 is a diagram showing a modification of display details of print setting items displayed on the portable terminal according to one or more embodiments of the present invention.

DETAILED DESCRIPTION OF EMBODIMENTS

Figure 1:
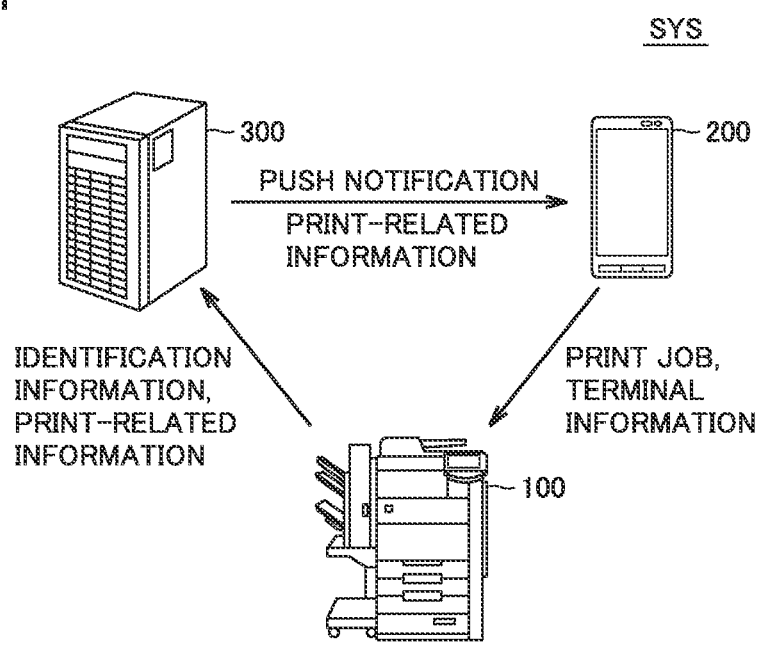
FIG. 1 is a schematic diagram for illustrating the configuration of an image processing system according to one or more embodiments of the present invention.

Hereinafter, embodiments of the present invention will be described with reference to the drawings. However, the scope of the invention is not limited to the disclosed embodiments.

In the following description, the same parts and components are designated by the same reference characters. Names and functions thereof are also the same. Accordingly, the description thereof will not be repeated.

<Summary of Image Processing System>

FIG. 1 is a schematic diagram for illustrating the configuration of an image processing system SYS according to one or more embodiments of the present invention. Image processing system SYS includes: a multi-functional peripheral (MFP) 100 as an example of an image forming apparatus; a portable terminal 200 capable of transmitting a print job to MFP 100; and a server 300 configured to send a push notification to portable terminal 200.

The push notification is a notification implemented using the push-type information distribution technique, through which information is transmitted from server 300 to portable terminal 200 without having to send a special request from portable terminal 200 to server 300. Server 300 sends a push notification to portable terminal 200 associated with the identification information based on the identification information by which portable terminal 200 can be identified. The identification information is information specific to each portable terminal 200, and also referred to as a token.

Portable terminal 200 transmits a print execution instruction as a print job to MFP 100 by utilizing the OS-standard printing function of portable terminal 200. From the information included in the print job, MFP 100 extracts the terminal information by which portable terminal 200 can be designated. Terminal information is typically an internet protocol (IP) address.

MFP 100 stores the terminal information and the identification information in association with each other. Based on the extracted terminal information, MFP 100 can designate the identification information of portable terminal 200 indicated by the terminal information. Furthermore, based on the received print job, MFP 100 generates print-related information used for setting the printing function specific to MFP 100. MFP 100 transmits, to server 300, the generated print-related information and the identification information of portable terminal 200 that has transmitted the print job.

Server 300 sends a push notification of the print-related information to portable terminal 200 associated with the identification information transmitted to server 300. The user can set the printing function specific to MFP 100 through portable terminal 200 by utilizing the print-related information transmitted from server 300.

<Device Configuration>

Figure 2:
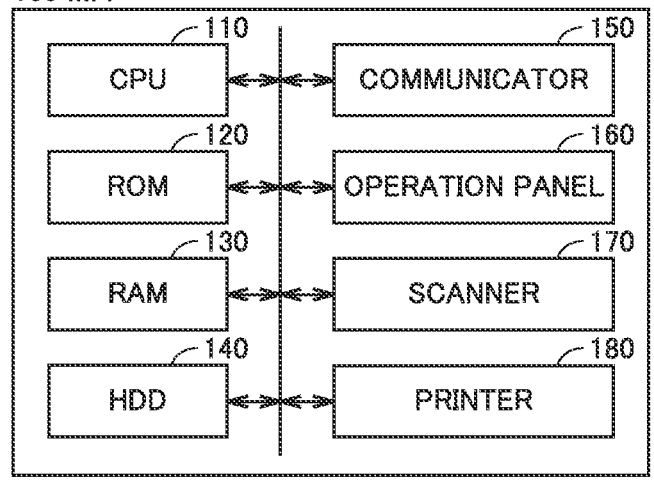
FIG. 2 is a block diagram showing an example of the device configuration of an MFP according to one or more embodiments of the present invention.
Figure 3:
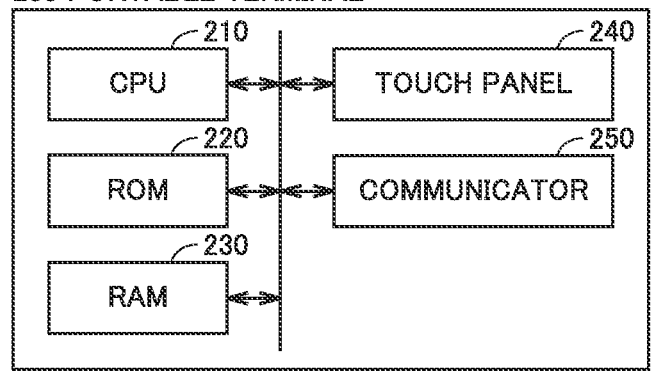
FIG. 3 is a block diagram showing an example of the device configuration of a portable terminal according to one or more embodiments of the present invention.
Figure 4:
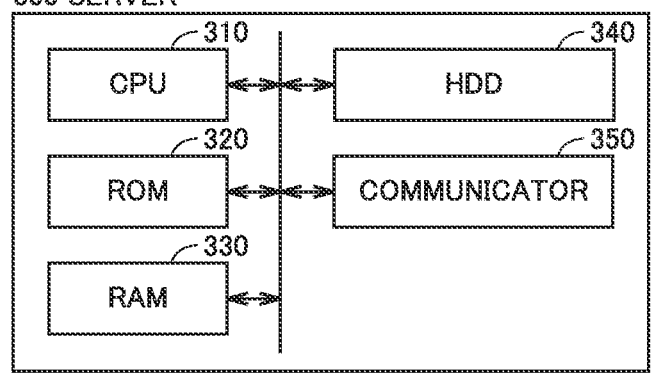
FIG. 4 is a block diagram showing an example of the device configuration of a server according to one or more embodiments of the present invention.

Referring to FIGS. 2 to 4, the device configuration of each of various devices included in image processing system SYS will be described. FIG. 2 is a block diagram showing an example of the device configuration of MFP 100. FIG. 3 is a block diagram showing an example of the device configuration of portable terminal 200. FIG. 4 is a block diagram showing an example of the device configuration of the server.

MFP 100 includes a central processing unit (CPU) 110 for controlling the entire device, a read only memory (ROM) 120 for storing a program executed by CPU 110, a random access memory (RAM) 130 serving as a work area at the time when the program is executed by CPU 110, and a hard disk drive (HDD) 140 for storing image data and the like. MFP 100 further includes a printer 180 and a scanner 170 as examples of hardware for executing an image formation process. In addition, MFP 100 includes an operation panel 160 and a communicator 150 for communicating with other devices through wireless communication such as the Internet.

Printer 180 performs a function as an image former for forming an image based on a print job. In addition to printing on a sheet of paper, printer 180 also may produce a portable document format (PDF) file.

Communicator 150 performs a function as a receiver configured to receive the information transmitted from portable terminal 200, and a function as a transmitter configured to transmit the information required for sending a push notification to server 300. Furthermore, HDD 140 performs a function as a memory for storing the terminal information and the identification information so as to be associated with each other.

The program stored in ROM 120 serves as a program for executing the registration process, the notification process and the printing process, which will be described later. The program may be stored in HDD 140 or may be stored in a memory card as an example of a non-transitory computer-readable storage medium. When the program stored in a memory card is distributed, MFP 100 includes an interface for reading the memory card, or an interface for communicating with a computer capable of reading the memory card. MFP 100 directly or indirectly reads the program stored in the memory card, stores the program in HDD 140 or ROM 120, and then executes the program.

Portable terminal 200 includes a CPU 210 for controlling the entire device, a ROM 220 for storing the program executed by CPU 210, and a RAM 230 serving as a work area during execution of the program by CPU 210 or for storing various pieces of information. Portable terminal 200 further includes a touch panel 240 and a communicator 250 for communicating with other devices through wireless communication. Touch panel 240 performs a function as an input unit through which information is input, and a function as a display on which information is displayed.

Server 300 includes a CPU 310 for controlling the entire device, a ROM 320 for storing the program executed by CPU 310, a RAM 330 serving as a work area during execution of the program by CPU 310, an HDD 340 for storing various pieces of information such as limitation information, and a communicator 350 for communicating with other devices through wireless communication.

<Operation of Image Processing System>

Figure 5:
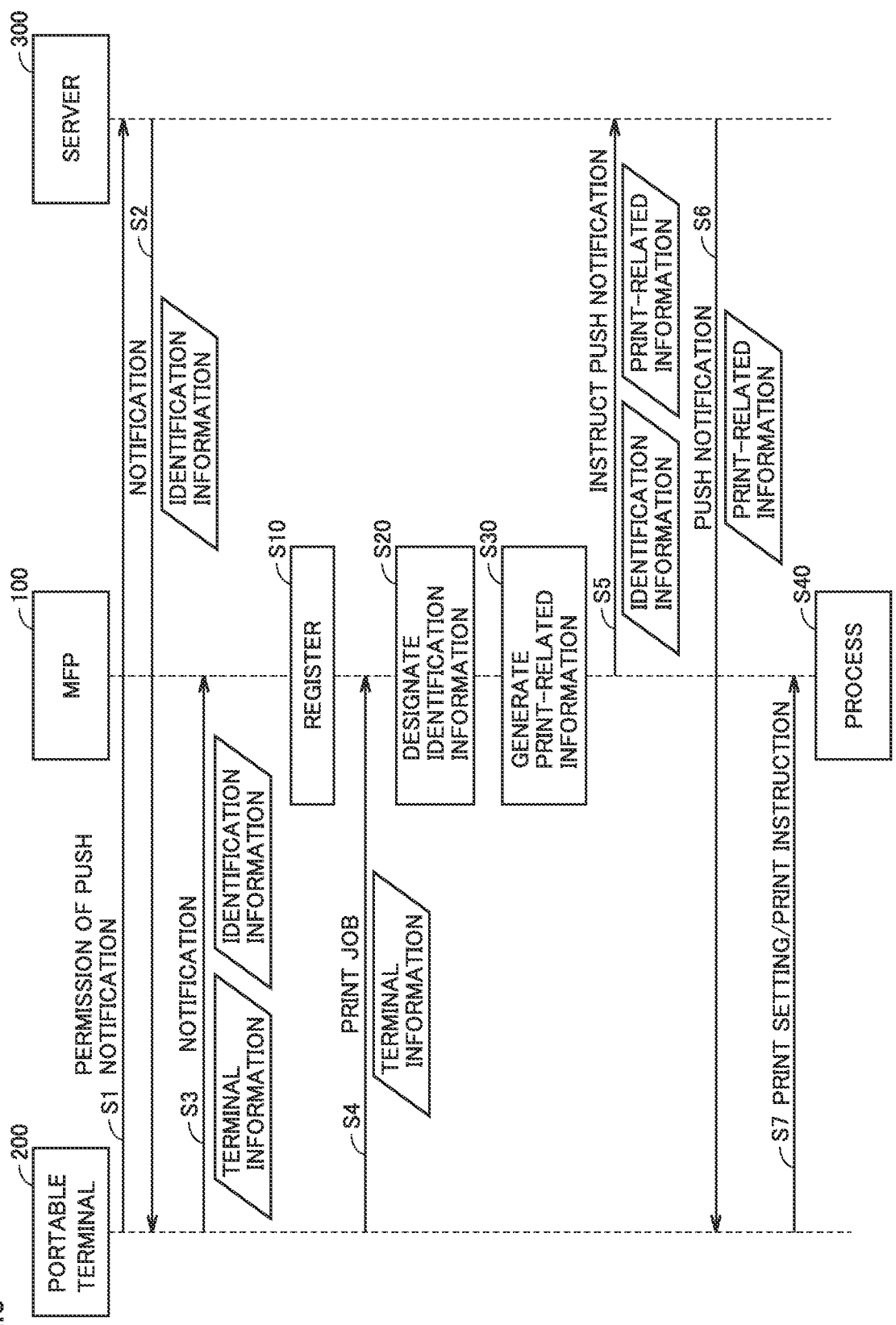
FIG. 5 is a sequence diagram for illustrating the operation of the image processing system according to one or more embodiments of the present invention.

FIG. 5 is a sequence diagram for illustrating the operation of image processing system SYS. In order to utilize image processing system SYS, the user needs to make advanced registration for permitting a push notification. For example, the user accesses the dedicated site of image processing system SYS through portable terminal 200, permits a notification, and completes the advanced registration. This dedicated site is managed by MFP 100. In addition, the dedicated site for advanced registration may be managed by another device that is different from MFP 100 and is capable of communicating with MFP 100.

The user accesses the dedicated site through portable terminal 200, and permits a push notification.

Then, in step S1, server 300 receives permission of a push notification from portable terminal 200. Upon reception of permission of a push notification, server 300 generates identification information used for identifying the portable terminal for which a push notification has been permitted.

In step S2, server 300 transmits the generated identification information to portable terminal 200.

In step S3, MFP 100 receives the identification information and the terminal information of portable terminal 200 from portable terminal 200.

In step S10, MFP 100 registers the terminal information of portable terminal 200 and the identification information of portable terminal 200 in association with each other. More specifically, CPU 110 of MFP 100 stores the terminal information of portable terminal 200 and the identification information of portable terminal 200 in association with each other in HDD 140 as an example of a memory.

When the user operates portable terminal 200 utilizing the OS-standard printing function of portable terminal 200, portable terminal 200 transmits a print job to MFP 100 in step S4. The transmission data of the print job transmitted from portable terminal 200 to MFP 100 includes the terminal information of portable terminal 200.

In step S20, MFP 100 extracts the terminal information included in the received data of the print job, and designates the identification information associated with the extracted terminal information. The identification information associated with the terminal information is designated based on the associated relation between the terminal information and the identification information that are registered in S10. In this case, extraction of the terminal information and designation of the identification information are performed by CPU 110 of MFP 100.

In step S30, based on the received data of the print job, MFP 100 generates print-related information about the print setting screen for utilizing the printing function of MFP 100. In this case, generation of the print-related information is performed by CPU 110 in MFP 100.

In step S5, MFP 100 instructs server 300 to send a push notification. The instruction details include: identification information designated by MFP 100 in step S20; and print-related information generated by MFP 100 in step S30. In this case, the process for sending a push notification is performed by CPU 110 in MFP 100. Furthermore, the instruction details are transmitted to server 300 by communicator 150 of MFP 100.

In step S6, based on the received identification information, server 300 sends a push notification of the print-related information to portable terminal 200. Thereby, the user can utilize the notified print-related information through portable terminal 200, and, for example, can transmit changes of print setting details, a print execution instruction and the like to MFP 100.

In step S7, portable terminal 200 can transmit changes of print setting details, a print execution instruction and the like to MFP 100.

In step S40, MFP 100 performs the process according to the instruction from portable terminal 200.

<Registration Process>

Figure 6:
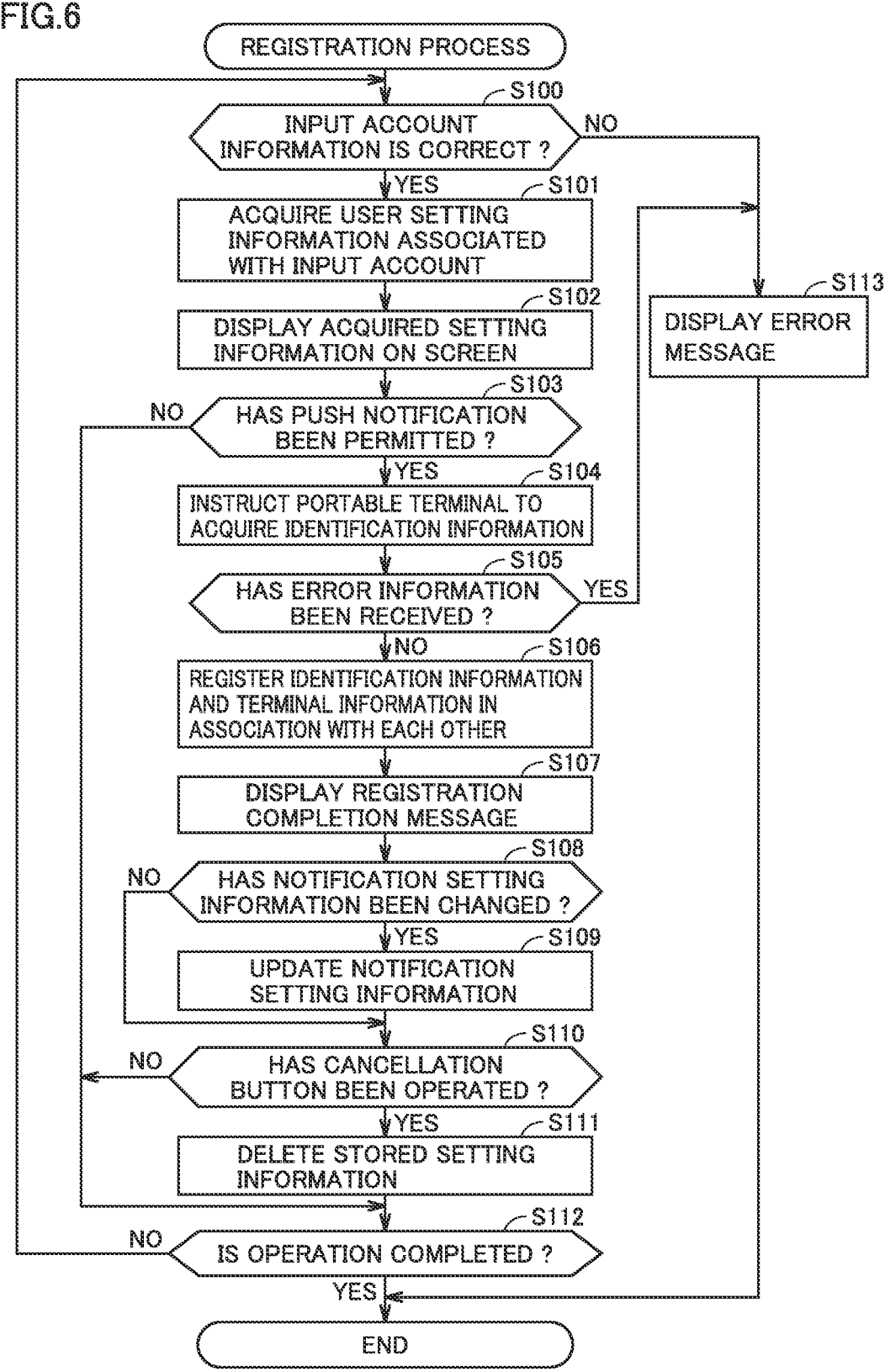
FIG. 6 is a flowchart of a registration process according to one or more embodiments of the present invention.

Referring to FIG. 6, the registration process for registering the identification information and the terminal information of the portable terminal in association with each other will be hereinafter described. FIG. 6 is a flowchart of the registration process. The registration process is performed by a user accessing the dedicated site for registration through portable terminal 200 and inputting the account that is set in advance for each user. Furthermore, the registration process is also performed for causing a memory to store the terminal information of the terminal and the identification information that allows identification of the portable terminal and that is generated based on permission of a push notification from the server to the portable terminal. The registration process is performed by CPU 110 in MFP 100. In addition, the registration process may be performed not by CPU 110 in MFP 100 but by a host server capable of communicating with MFP 100.

In step S100, CPU 110 determines whether the input account information is correct or not. The account is defined in advance for each user. MFP 100 causes the memory such as HDD 140 to store the account information defined for each user. CPU 110 searches the account information stored in the storage for the account information that matches with the input account information. When there is account information that matches with the input account information, CPU 110 determines that the input account information is correct. When CPU 110 determines that the input account information is not correct (NO in step S100), CPU 110 shifts the control to step S113.

When CPU 110 determines that the input account information is correct (YES in step S100), CPU 110 shifts the control to step S101.

In step S101, CPU 110 acquires the user setting information associated with the input account. The memory such as HDD 140 stores the user setting information in association with the account information. The setting information is the information about permission of a push notification and the information referred to by MFP 100 during generation of print-related information. The information referred to by MFP 100 during generation of print-related information (which will be hereinafter also referred to as "notification setting information") includes: information showing whether the print setting specific to MFP 100 is performed or not; and information showing whether a print preview is displayed or not.

In step S102, CPU 110 causes a screen to display the acquired setting information. In step S103, CPU 110 determines whether a push notification has been permitted or not. When CPU 110 determines that a push notification has not been permitted (NO in step S103), CPU 110 shifts the control to step S112.

When CPU 110 determines that a push notification has been permitted (YES in step S103), CPU 110 shifts the control to step S104.

In step S104, CPU 110 instructs portable terminal 200 to acquire identification information. Upon reception of the instruction to acquire the identification information, portable terminal 200 gives a notification about permission of a push notification in order to cause server 300 to generate identification information. Server 300 generates identification information and transmits the generated identification information to portable terminal 200. Portable terminal 200 transmits the received identification information to MFP 100. When an error occurs during the process from when portable terminal 200 is instructed to acquire the identification information until when the identification information is transmitted to portable terminal 200, portable terminal 200 transmits error information to MFP 100.

In step S105, CPU 110 determines whether error information has been received or not. When CPU 110 determines that error information has been received (YES in step S105), CPU 110 shifts the control to step S113. When CPU 110 determines that error information has not been received (NO in step S105), CPU 110 shifts the control to step S106.

In step S106, CPU 110 registers the terminal information and the identification information that is transmitted from portable terminal 200 in association with each other. In other words, CPU 110 causes the memory such as HDD 140 to store the identification information transmitted from portable terminal 200 and the terminal information of portable terminal 200 in association with each other.

In step S107, CPU 110 causes a screen to display a registration completion message. In this case, the screen in the registration process is a touch panel 240 of portable terminal 200. For example, CPU 110 may notify server 300 about completion of registration to cause server 300 to transmit a registration completion message to portable terminal 200, or CPU 110 may transmit a registration completion message to portable terminal 200.

In step S108, CPU 110 determines whether the notification setting information has been changed or not. When CPU 110 determines that the notification setting information has been changed (YES in step S108), CPU 110 shifts the control to step S109.

In step S109, CPU 110 updates the notification setting information. When CPU 110 determines that the notification setting information has not been changed (NO in step S108), CPU 110 shifts the control to step S110.

In step S110, CPU 110 determines whether the setting has been canceled or not. When CPU 110 determines that the setting has been canceled (YES in step S110), CPU 110 shifts the control to step S111.

In step S111, CPU 110 deletes the stored setting information. Specifically, CPU 110 deletes the terminal information and the identification information that are stored. When CPU 110 determines that the setting has not been canceled (NO in step S110), CPU 110 shifts the control to step S112.

In step S112, CPU 110 determines whether the instruction to complete the operation has been received or not. When CPU 110 determines that the instruction to complete the operation has not been received (NO in step S112), CPU 110 repeats the process from step S100 to step S112 until it determines that the instruction to complete the operation has been received. When CPU 110 determines that the instruction to complete the operation has been received (YES in step S112), CPU 110 ends the process.

Furthermore, in step S113, CPU 110 causes a screen to display an error message, and then, ends the process.

<Setting Information>

FIG. 7 is a diagram for illustrating the setting information stored for each account. MFP 100 stores identification information, terminal information and notification setting information for each account. The account column in FIG. 7 includes account information. The identification information column includes the identification information registered for each account. The terminal information column includes the terminal information registered for each account. The notification setting information column includes the notification setting information registered for each account.

The preview column in the notification setting information column includes the information that is registered for each account and that shows whether a print preview is displayed or not. Also, "ON" in the preview column indicates that a print preview is displayed, and "OFF" indicates that a print preview is not displayed. Furthermore, the print setting column in the notification setting information column includes the information that is registered for each account and that shows whether the print setting specific to MFP 100 is performed or not. Also, "ON" in the print setting column indicates that the print setting specific to MFP 100 is performed, and "OFF" indicates that the print setting specific to MFP 100 is not performed.

As shown in FIG. 7, the memory can store a plurality of pieces of setting information for one account. Specifically, for the account information registered as UserB, the portable terminal having terminal information as "100.100.102" and the portable terminal having terminal information as "100.100.103" are registered. Furthermore, the same setting information can be registered by a plurality of accounts. Specifically, for each of UserC and UserD, the portable terminal having terminal information as "100.100.104" is registered.

In other words, CPU 110 in MFP 100 performs the registration process, thereby allowing HDD 140 as a memory to store one terminal information or a plurality of pieces of terminal information in association with one user. Furthermore, CPU 110 in MFP 100 performs the registration process, thereby allowing HDD 140 as a memory to store the same terminal information in association with a plurality of users.

<Notification Process>

Figure 8:
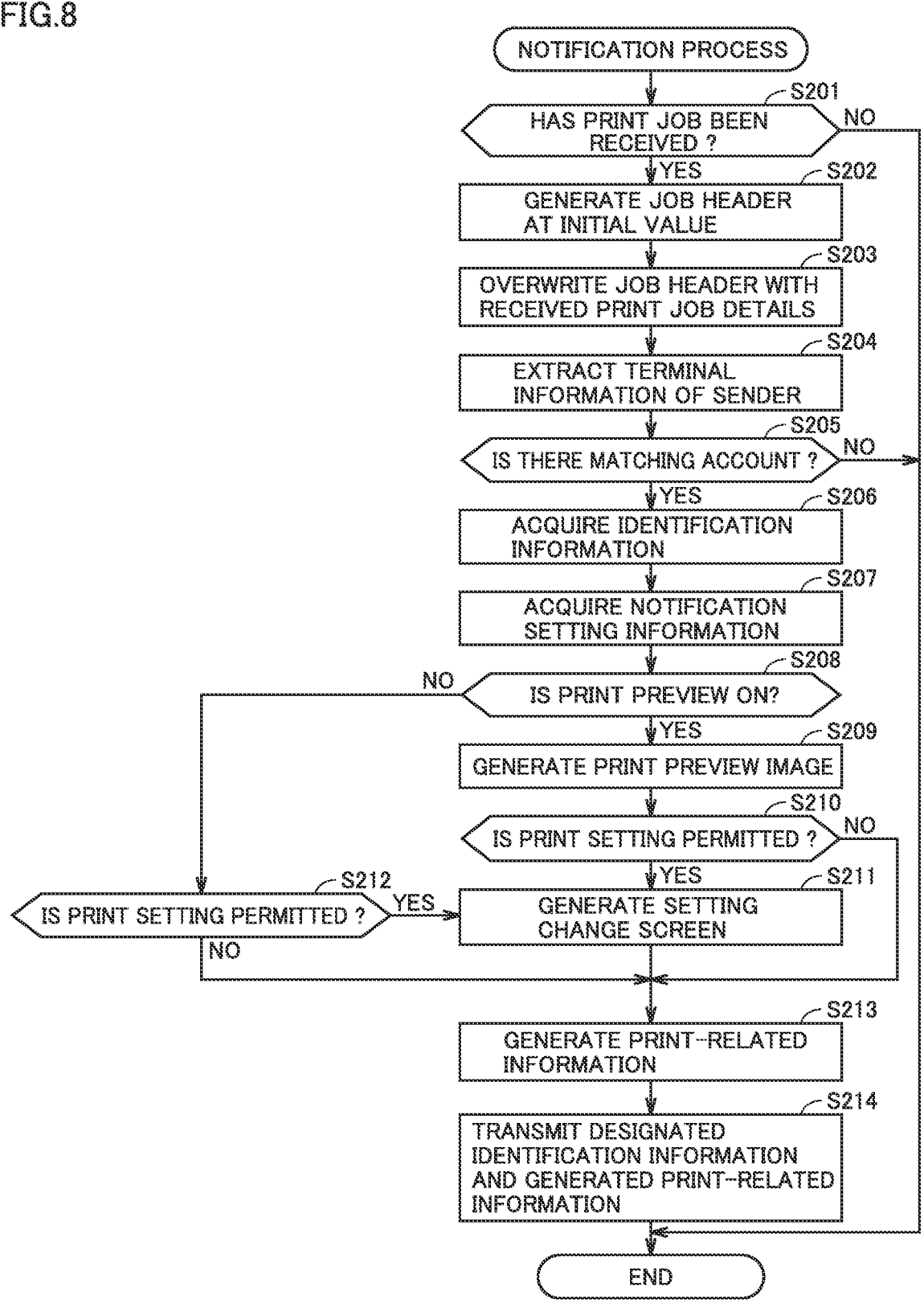
FIG. 8 is a flowchart of a notification process according to one or more embodiments of the present invention.

Referring to FIG. 8, an explanation will be hereinafter given with regard to the notification process performed by CPU 110 in MFP 100 for causing server 300 to send, to portable terminal 200, a push notification about the information generated based on the received print job. FIG. 8 is a flowchart showing the notification process.

In step S201, CPU 110 determines whether the print job has been received or not. Then, when CPU 110 determines that the print job has not been received (NO in step S201), it ends the process.

When CPU 110 determines that the print job has been received (YES in step S201), CPU 110 shifts the control to step S202. In step S202, CPU 110 generates a job header at an initial value.

In step S203, CPU 110 overwrites the job header with the received print job details. In other words, CPU 110 performs the process of step S202 and step S203, thereby generating a job header based on the received print job details.

In step S204, CPU 110 extracts the terminal information of the sender. Specifically, CPU 110 extracts the IP address of portable terminal 200 of the sender from the received data of the print job.

In step S205, CPU 110 determines whether there is an account matching with the extracted terminal information. When there is no account matching with the extracted terminal information (NO in step S205), CPU 110 ends the process.

When there is an account matching with the extracted terminal information (YES in step S205), CPU 110 shifts the control to step S206. In step S206, CPU 110 acquires the identification information associated with the matching account. In other words, CPU 110 performs the process of step S205 and step S206, thereby designating the identification information associated with the extracted terminal information from the information stored in HDD 140.

In step S207, CPU 110 acquires the notification setting information associated with the account. In step S207, the information acquired by CPU 110 is information showing whether the print setting specific to MFP 100 is performed or not and whether a print preview is displayed or not.

In step S208, based on the notification setting information, CPU 110 determines whether a print preview is displayed or not. When CPU 110 determines that a print preview is not displayed (NO in step S208), CPU 110 shifts the control to step S212.

When CPU 110 determines that a print preview is displayed (YES in step S208), CPU 110 shifts the control to step S209. In step S209, CPU 110 generates a screen for a print preview (a print preview screen) based on the received print job.

In step S210 and step S212, CPU 110 determines whether the print setting specific to MFP 100 is permitted or not. When the print setting specific to MFP 100 is permitted (YES in step S210 or step S212), CPU 110 generates a screen for changing the setting (setting change screen).

When the print setting specific to MFP 100 is not permitted (NO in step S210 or step S212), CPU 110 shifts the control to step S213 without generating a screen for changing the setting.

In step S213, CPU 110 generates print-related information. Specifically, CPU 110 generates a URL used for accessing the print setting screen including at least one of: the screen for a print preview generated in step S209 and the screen for print setting generated in step S211. In other words, CPU 110 performs the process of step S208 to step S213, thereby generating the information about the print setting screen.

When CPU 110 performs step S213 without performing step S211, the print setting screen includes only a print preview screen. Furthermore, when CPU 110 performs step S213 without performing step S209, the print setting screen includes only a setting change screen for performing the print setting specific to MFP 100. Also, when CPU 110 performs step S209 and step S211 and then performs step S213, the print setting screen includes a print preview screen and a setting change screen.

In step S214, CPU 110 transmits the identification information acquired in step S206 and the print-related information generated in step S213 to server 300, and then, ends the process. Server 300 sends a push notification of the print-related information to portable terminal 200 associated with the identification information transmitted from MFP 100. In other words, CPU 110 performs the process of step S206, thereby instructing server 300 to send a push notification of the print-related information generated in step S213 to the portable terminal associated with the identification information designated in step S206.

In addition, in step S205, when there is no account associated with the terminal information of portable terminal 200 having transmitted the print job, MFP 100 ends the notification process and executes printing based on the received print job details.

<Printing Process>

Figure 9:
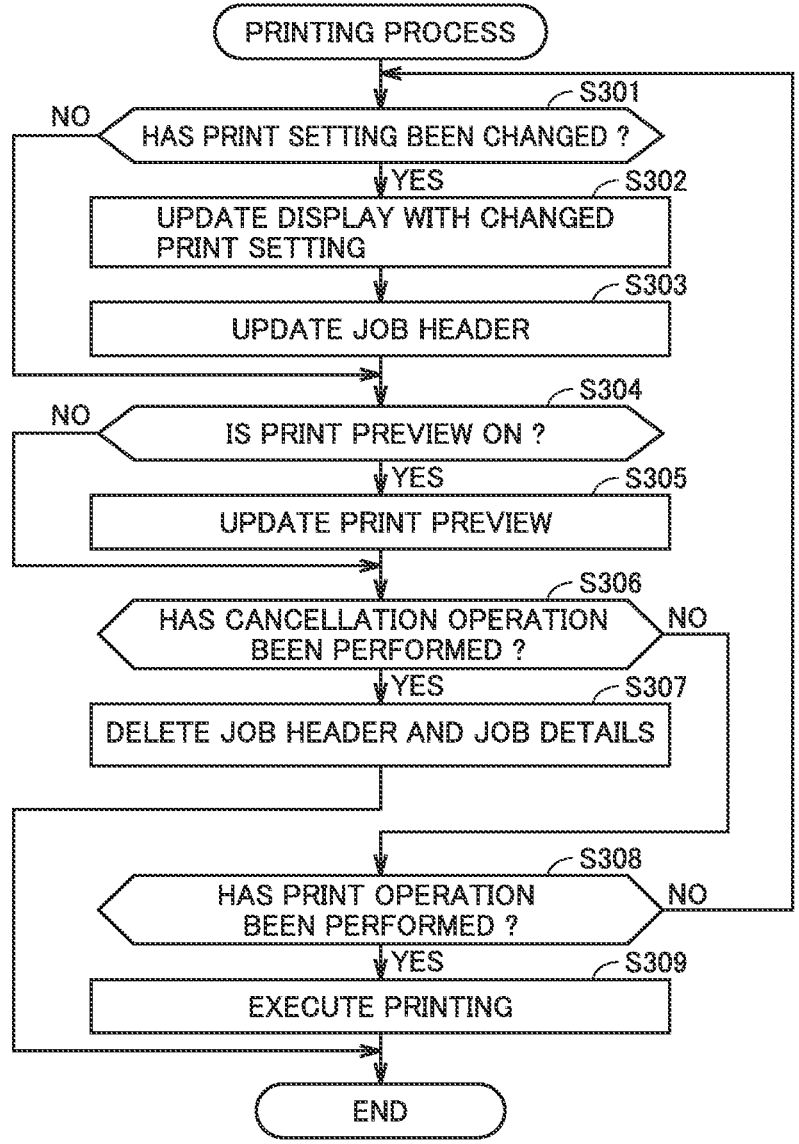
FIG. 9 is a flowchart of a printing process according to one or more embodiments of the present invention.

Referring to FIG. 9, an explanation will be hereinafter given with regard to the printing process performed when portable terminal 200 receives the print-related information and the user accesses the URL included in the print-related information according to the print-related information. FIG. 9 is a flowchart of the printing process.

In step S301, CPU 110 determines whether the print setting has been changed or not. When CPU 110 determines that the print setting has not been changed (NO in step S301), CPU 110 shifts the control to step S304.

When CPU 110 determines that the print setting has been changed (YES in step S301), CPU 110 shifts the control to step S302. In step S302, CPU 110 updates the display with the changed print setting. Then, in step S303, CPU 110 updates the job header with the changed print setting details.

In step S304, CPU 110 determines whether a print preview is displayed or not. When CPU 110 determines that a print preview is displayed (YES in step S304), CPU 110 shifts the control to step S305. In step S305, CPU 110 updates the print preview.

When CPU 110 determines that a print preview is not displayed (NO in step S304), CPU 110 shifts the control to step S306 without updating the print preview.

In step S306, CPU 110 determines whether a cancellation operation has been performed or not. When the cancellation operation has been performed (YES in step S306), CPU 110 shifts the control to step S307. In step S307, CPU 110 deletes the details of the job header and ends the process.

When the cancellation operation has not been performed (NO in step S306), CPU 110 shifts the control to step S308. In step S308, CPU 110 determines whether a print operation has been performed or not. When CPU 110 determines that the print operation has been performed (YES in step S308), CPU 110 shifts the control to step S309. In step S309, CPU 110 executes printing according to the job header, and then, ends the process.

When CPU 110 determines that the print operation has not been performed (NO in step S308), CPU 110 repeats the operation from step S301 to step S308 until the cancellation operation or the print operation is performed.

<Display Example of Print Setting Screen Displayed on Portable Terminal>

Figure 10A:
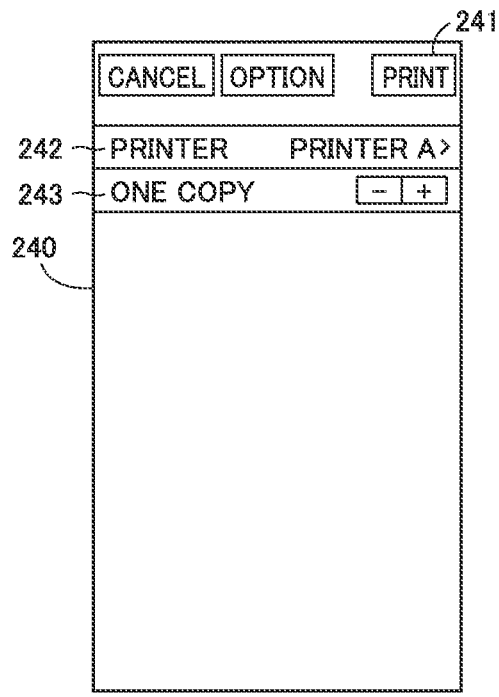
FIGS. 10A to 10E each show an example of a display screen of the portable terminal according to one or more embodiments of the present invention.

Referring to FIGS. 10A to 10E, the print setting screen displayed on the portable terminal will be hereinafter described. FIGS. 10A to 10E each show an example of a display screen of the portable terminal. FIG. 10A shows a screen displayed on touch panel 240 at the time when a print job is transmitted to MFP 100. For example, touch panel 240 shows the type of printer (242) to which a print job is transmitted and the number of copies (243). When a print icon 241 is tapped in this state, the print job is transmitted to a printer A that is MFP 100.

Figure 10B:
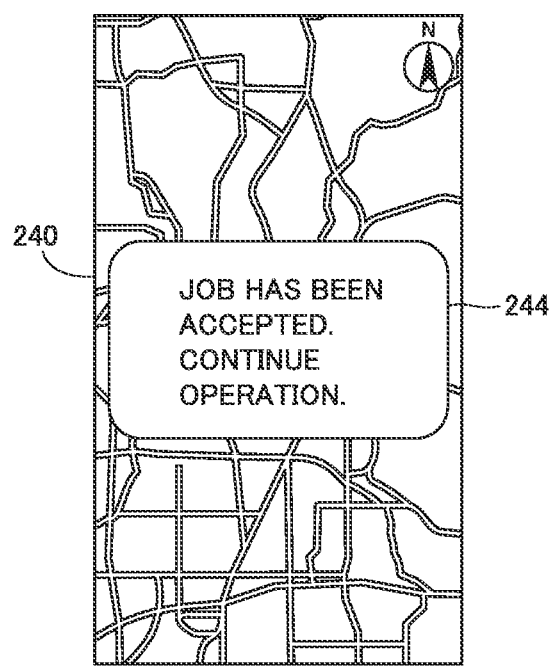

When the print job is transmitted, MFP 100 performs the notification process to transmit print-related information and identification information to server 300. When server 300 sends a push notification, a notification message 244 that urges continuation of the print setting is displayed on touch panel 240 as shown in FIG. 10B. When the user taps notification message 244, the screen on touch panel 240 is changed to a print setting screen shown in FIG. 10C, FIG. 10D or FIG. 10E.

Figure 10C:
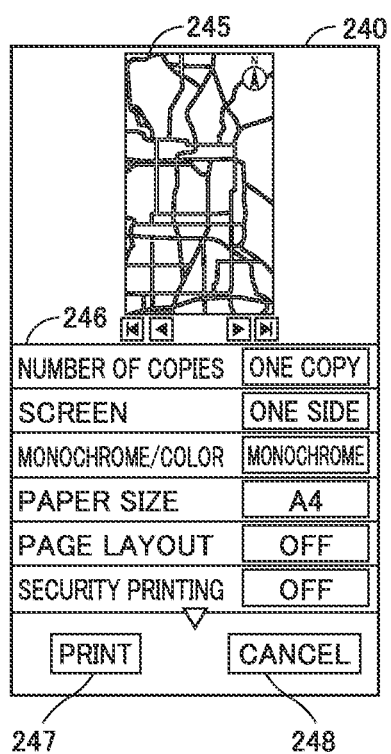

FIG. 10C shows a print setting screen displayed on touch panel 240 at the time when displaying a preview and performing print setting are registered as notification setting information. A print preview screen 245 and a setting change screen 246 for print setting are displayed on touch panel 240. The user taps setting change screen 246 to change the setting details to desirable setting details, so that the user can execute the print setting specific to MFP 100. Also, when the user taps a print icon 247, printing is executed according to the setting details displayed on touch panel 240. On the other hand, when the user taps a cancellation icon 248, printing is canceled.

Figure 10D:
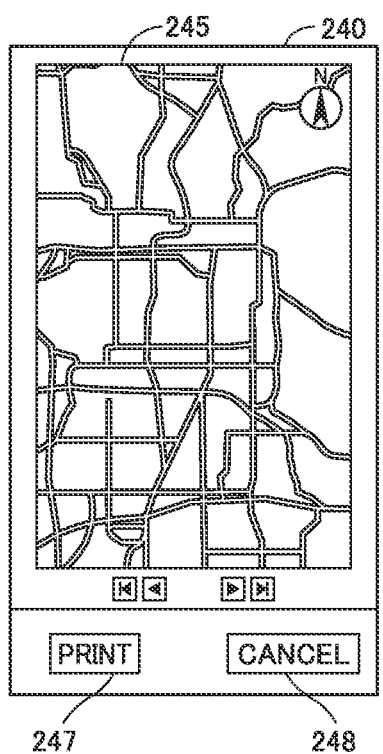
Figure 10E:
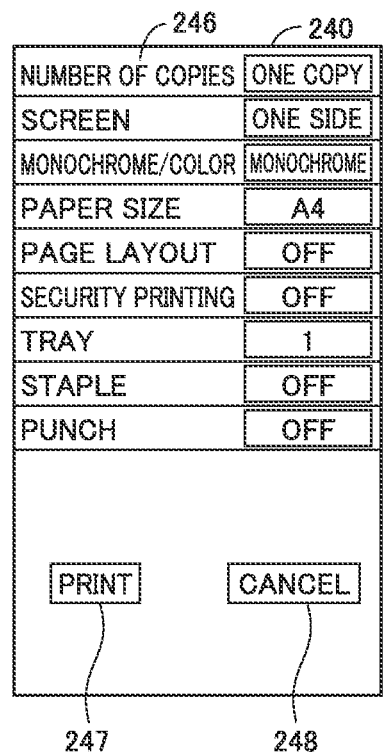

FIG. 10D shows a print setting screen displayed on touch panel 240 at the time when displaying a preview and not performing the print setting are registered as notification setting information. As shown in FIG. 10D, only print preview screen 245 is displayed on touch panel 240. FIG. 10E shows a print setting screen displayed on touch panel 240 at the time when not displaying a preview and performing the print setting are registered as notification setting information. As shown in FIG. 10E, only setting change screen 246 is displayed on touch panel 240. In addition, the display examples shown in FIGS. 10A to 10E are shown by way of example, and the print setting screen may be shown in another display manner. Furthermore, the preview display and the print setting may be switched between ON and OFF on the print setting screen shown in each of FIGS. 10C to 10E. In other words, the print setting screen may also include a notification setting change screen for changing the notification setting information.

<Display of Print Setting Items>

Referring to FIG. 11, an explanation will be hereinafter given with regard to the details displayed as print setting items on setting change screen 246 shown in FIGS. 10C and 10E. FIG. 11 is a diagram illustrating the display details of the print setting items displayed on portable terminal 200. The setting item column of the MFP shows print setting items that can be set in MFP 100. The setting range column of the MFP shows the range that can be set by MFP 100 for each print setting item. For example, FIG. 11 discloses MFP 100 capable of selecting 1 to 100 copies. The initial setting column of the MFP shows the initial setting of MFP 100 that is determined in advance for each print setting item. The print job details column shows the setting at the time when the OS-standard printing function of portable terminal 200 is utilized for each print setting item, and also shows the information included in the print job. Furthermore, "unchangeable" in the print job details column means that the setting detail shown in the column is set as an initial value and cannot be changed when the OS-standard printing function of portable terminal 200 is used. Furthermore, "N/A (not applicable)" in the print job details column means that the setting cannot be done when the OS-standard printing function of portable terminal 200 is used. The display column on the print setting screen shows the display manner of the print setting screen (setting change screen 246) displayed on portable terminal 200, and also shows the details of the job header generated when MFP 100 receives a print job.

As shown in FIG. 11, MFP 100 generates a job header based on the print job details transmitted from portable terminal 200, and also generates a job header based on the initial setting details of MFP 100 with regard to the setting items not including information and defined as "N/A (not applicable)". In other words, CPU 110 of MFP 100 registers the setting information about the print setting included in the print job as an initial value displayed on the setting change screen. Furthermore, with regard to the setting items not included in the print job among the setting items, CPU 110 of MFP 100 registers the predetermined setting information as an initial value to be displayed on the setting change screen. The item that can be set may have already been set by the user before the user uses the OS-standard printing function of portable terminal 200. In such a situation, when a job header is generated without reflecting the print job details, the items that have already been set also need to be set again. However, the print job details are reflected, thereby eliminating the need for the user to set the items again.

FIGS. 12 to 14 each are a diagram illustrating a modification of the display details in the print setting items displayed on portable terminal 200. In FIGS. 12 to 14, since the setting item column of the MFP, the setting range column of the MFP, the initial setting column of the MFP, and the print job details column are the same as those in FIG. 11, the description thereof will not be repeated. FIG. 12 shows an example in which a job header is generated based on the initial setting details of MFP 100 irrespective of the print job details. In other words, CPU 110 of MFP 100 does not register the setting information about the print setting included in the print job as an initial value to be displayed on the setting change screen, but may register the predetermined setting information as an initial value to be displayed on the setting change screen. In this way, by generating a job header based on the initial setting details of MFP 100, the processing load to MFP 100 associated with generation of the job header can be reduced.

FIGS. 13 and 14 each show an example in which the setting items that can be changed utilizing the OS-standard printing function of portable terminal 200 cannot be changed on the print setting screen. In other words, CPU 110 in MFP 100 may be configured such that the setting items set by the print job (the OS-standard printing function) cannot be changed through the setting change screen. FIG. 13 shows an example in which the print setting items that cannot be changed are shown in gray so as to notify the user that these print setting items cannot be changed. Also, FIG. 14 shows an example in which the print setting items that cannot be changed are not displayed.

<Functional Configuration>

Figure 15:
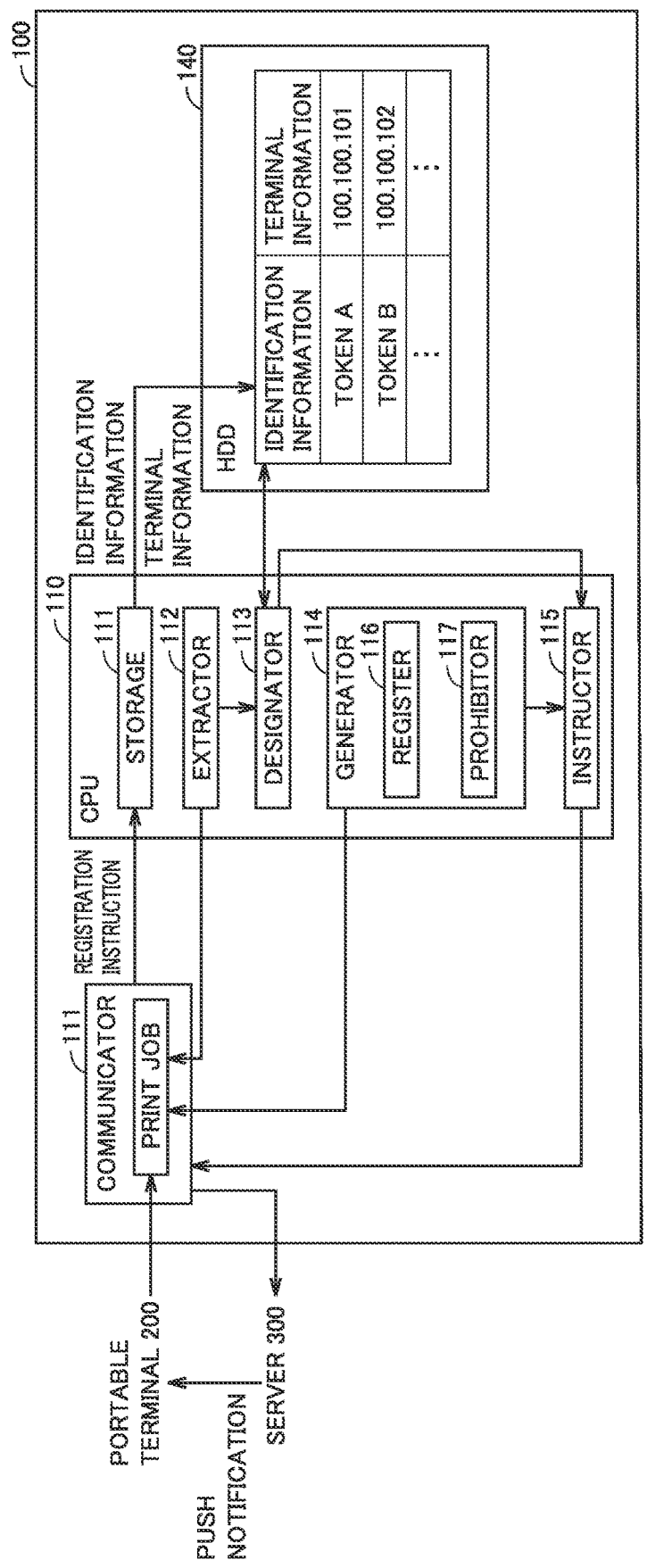
FIG. 15 is a block diagram showing an example of the functional configuration provided in the MFP according to one or more embodiments of the present invention.

FIG. 15 is a block diagram showing an example of the functional configuration included in MFP 100. Each functional configuration shown in FIG. 15 performs a function of carrying out the registration process, the notification process, and the printing process.

CPU 110 in MFP 100 includes a storage 111, an extractor 112, a designator 113, a generator 114, and an instructor 115.

Storage 111 performs a function of carrying out the registration process. More specifically, upon permission of the push notification to the terminal, server 300 generates identification information of the portable terminal. Then, portable terminal 200 transmits the generated identification information and the terminal information to MFP 100. When communicator 150 receives the information, storage 111 causes HDD 140 to store the identification information and the terminal information in association with each other. Specifically, communicator 150 notifies storage 111 that the instruction about registration (registration instruction) has been received. In addition to the identification information and the terminal information, the notification setting information may be stored in association with the identification information and the terminal information.

Extractor 112, designator 113, generator 114, and instructor 115 perform a function of carrying out the notification process. When communicator 150 receives the print job transmitted from portable terminal 200, extractor 112 extracts an IP address as terminal information of the portable terminal from the received data of the print job.

Designator 113 designates the identification information of the portable terminal based on the IP address extracted by extractor 112. Specifically, designator 113 designates the terminal information that matches with the IP address extracted by extractor 112 from among the terminal information stored in HDD 140, and designates the identification information stored in association with the designated terminal information.

Generator 114 generates information about the print setting screen based on the received print job. Specifically, generator 114 generates a URL used by portable terminal 200 for accessing the print setting screen.

Generator 114 may further include a register 116 and a prohibitor 117. Register 116 registers the initial value to be displayed on setting change screen 246. The initial value may be information included in the print job as shown in FIG. 11, or may be predetermined information as shown in FIG. 12.

Prohibitor 117 prohibits some of the plurality of setting items from being changed through setting change screen 246. The setting items that cannot be changed through setting change screen 246 are, for example, a setting item included in the print job and a setting item included in the OS-standard printing function.

Through communicator 150, instructor 115 instructs server 300 to send a push notification of the information about the print setting screen generated by generator 114 to portable terminal 200 associated with the identification information designated by designator 113. Based on the instruction from instructor 115, server 300 sends a push notification of the information about the print setting screen to portable terminal 200 that has transmitted the print job. In other words, instructor 115 and server 300 cooperatively function as a notifier configured to perform the process for sending a push notification of the information about the print setting screen to the portable terminal associated with the identification information.

According to image processing system SYS of one or more embodiments, when printing is executed from portable terminal 200 utilizing MFP 100, the function that cannot be utilized only by the OS-standard printing function of portable terminal 200 can be utilized without having to download an application to portable terminal 200.

Furthermore, as shown in FIG. 7, MFP 100 can register a plurality of pieces of setting information for one account. Accordingly, even when the user owns a plurality of portable terminals, the plurality of portable terminals can be managed by one account.

Also, as shown in FIG. 7, MFP 100 can register the same setting information for a plurality of accounts. Accordingly, even when a plurality of users use one portable terminal, MFP 100 can manage this one portable terminal.

Furthermore, according to image processing system SYS of one or more embodiments, a print preview function can be utilized. Thus, the user can check the display after printing in advance.

Furthermore, according to image processing system SYS of one or more embodiments, the setting change screen for print setting can be displayed. Accordingly, the MFP 100-specific printing function that cannot be utilized only by the OS-standard printing function of portable terminal 200 can be utilized.

Figure 16:
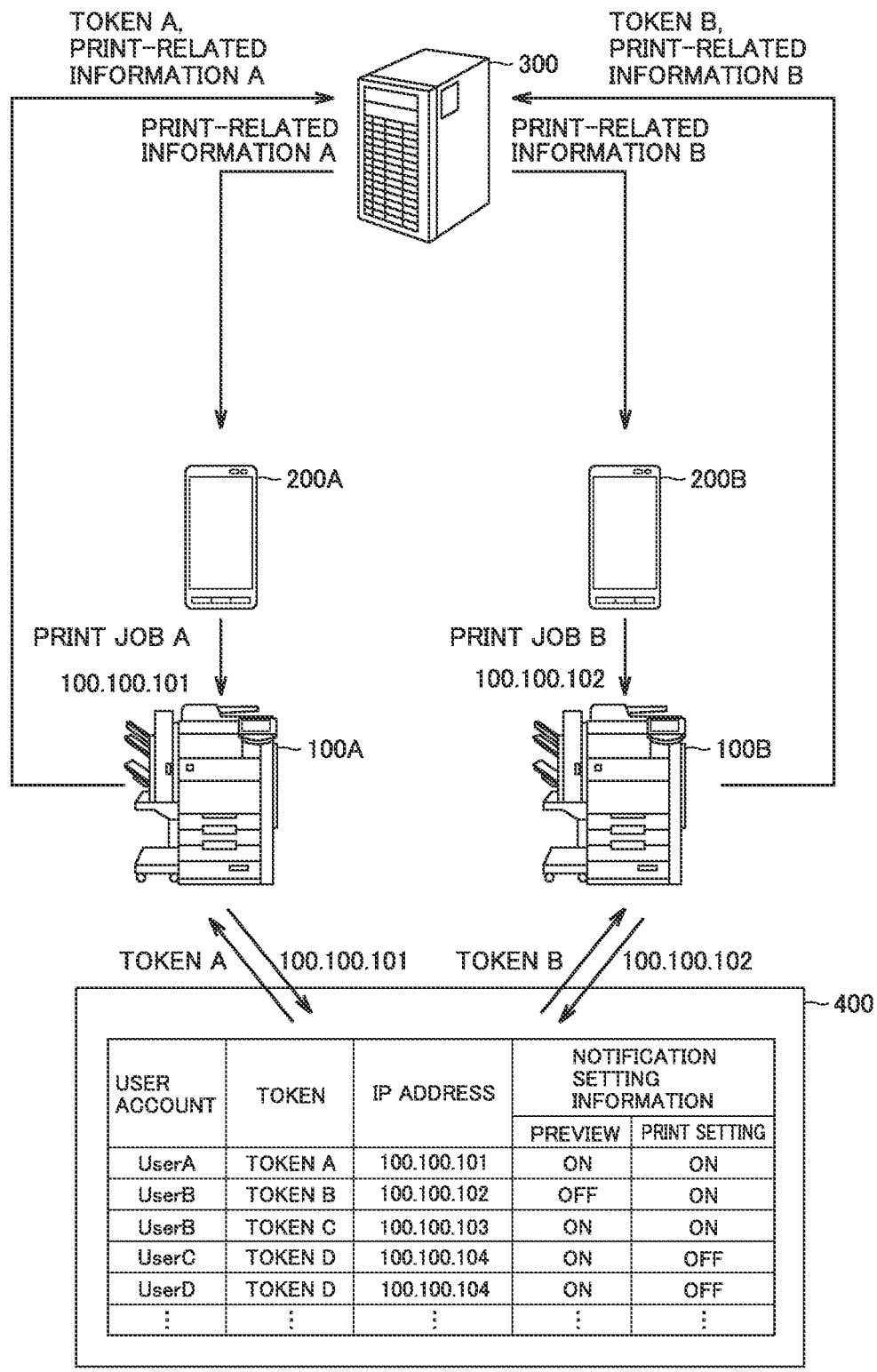
FIG. 16 is a schematic diagram for illustrating the configuration of an image processing system according to one or more embodiments of the present invention.

In the aforementioned embodiments, MFP 100 is configured to store and manage the setting information. However, another management device 400 capable of communicating with MFP 100 may store and manage the setting information. Specifically, management device 400 may have the functions of storage 111 and HDD 140 that are shown in FIG. 15. Furthermore, management device 400 may have the function of designator 113 shown in FIG. 15. FIG. 16 is a schematic diagram for illustrating the configuration of an image processing system according to one or more embodiments of the present invention. An MFP 100A and an MFP 100B are communicatively connected to management device 400. When portable terminal 200A transmits a print job A to MFP 100A, MFP 100A transmits the terminal information (100.100.101) included in print job A to management device 400. Management device 400 transmits the identification information (token A) and the notification setting information that are associated with the transmitted terminal information. Based on the transmitted notification setting information and print job A, MFP 100A generates print-related information A, and then, transmits token A and print-related information A to server 300. Based on the received token A, server 300 designates the destination of the push notification and sends a push notification of print-related information A to portable terminal 200A. The configuration of the image processing system according to one or more embodiments excluding the above-described configurations has the same configuration as that of the image processing system according to the above-described embodiments. The functions thereof are also the same. Accordingly, the description of the same configurations will not be repeated.

Also when portable terminal 200B transmits a print job B to MFP 100B, the same process as that performed when portable terminal 200A transmits print job A to MFP 100A is performed. Server 300 sends a push notification of print-related information B.

According to image processing system SYS of one or more embodiments, the user does not have to execute settings about permission of the notification for each MFP 100.

Figure 17:
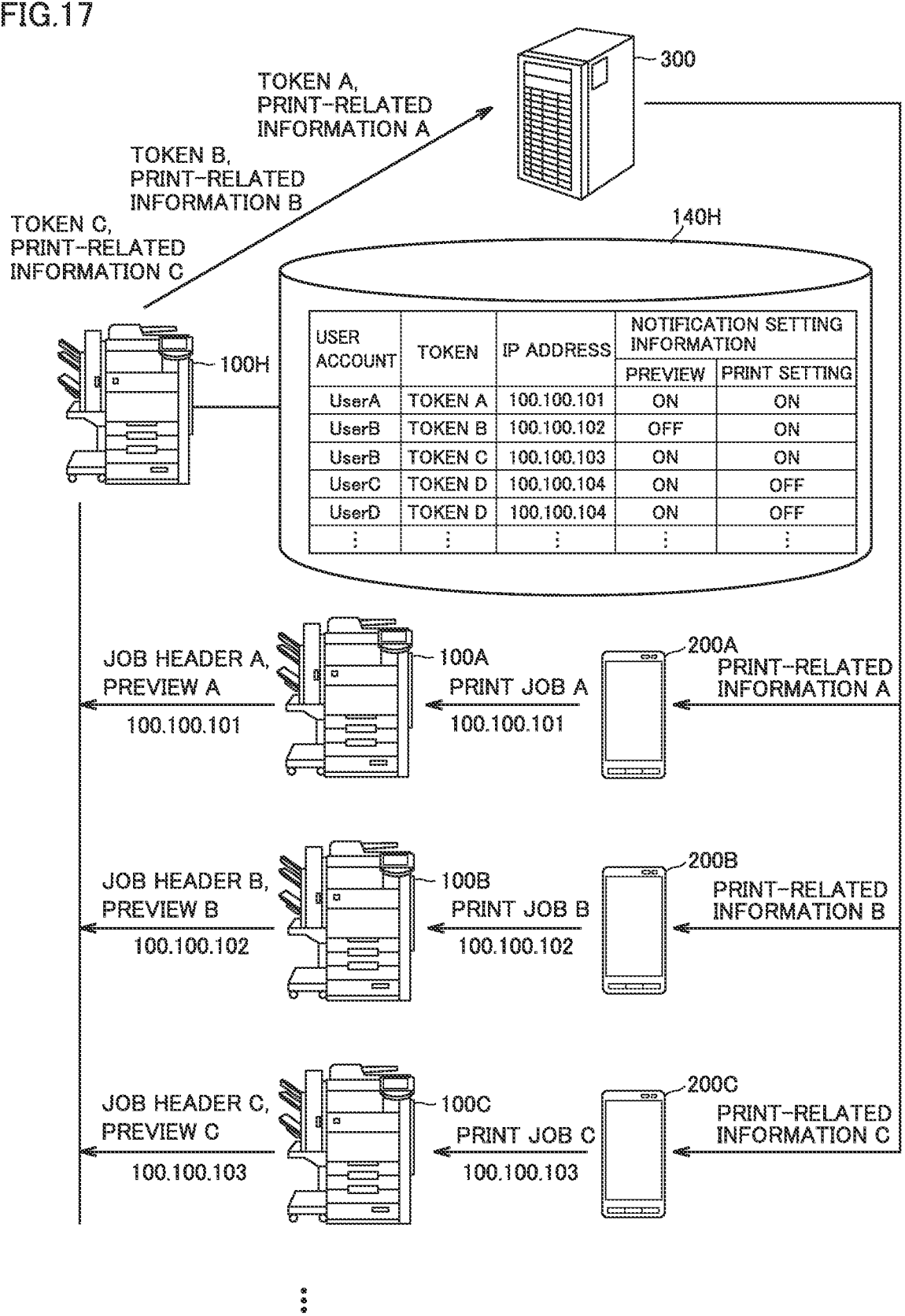
FIG. 17 is a schematic diagram for illustrating the configuration of an image processing system according to one or more embodiments of the present invention.

In the aforementioned embodiments, MFP 100 is configured to store and manage the setting information. However, another MFP 100H capable of communicating with MFP 100 may store and manage the setting information. FIG. 17 is a schematic diagram for illustrating the configuration of an image processing system according to one or more embodiments of the present invention. As shown in FIG. 17, MFP 100H capable of communicating with a plurality of MFP 100A to MFP 100C stores and manages the setting information. Typically, MFP 100A to MPF 100C are slave units of MFP 100H. MFP 100H includes an HDD 140H. Furthermore, MFP 100H has functions of storage 111, extractor 112, designator 113, generator 114, and instructor 115, which are shown in FIG. 15.

The configuration of the image processing system according to one or more embodiments excluding the above-described configurations has the same configuration as that of the image processing system according to the above-described embodiments. The functions thereof are also the same. Accordingly, the description of the same configurations will not be repeated.

The following is an explanation about the case where portable terminal 200A transmits print job A to MFP 100A. Based on print job A, MFP 100A generates job header A and print preview A, and extracts terminal information (100.100.101). MFP 100A transmits job header A, print preview A, and the extracted terminal information to MFP 100H. Based on the transmitted terminal information, MFP 100H acquires the identification information (token A) and the notification setting information associated with the terminal information from the setting information stored in HDD 140H for each account. MFP 100H generates print-related information A based on job header A, print preview A, and the acquired notification setting information. MFP 100H transmits the generated print-related information A and token A to server 300. Server 300 sends a push notification of print-related information A to portable terminal 200A associated with token A.

Also when portable terminal 200B transmits print job B to MFP 100B, the same process as that performed when portable terminal 200A transmits print job A to MFP 100A is performed, thereby sending a push notification of print-related information B to portable terminal 200B.

Although the setting information is stored in HDD 140H of MFP 100H, the setting information may be stored in an HDD, a USB memory, a memory disk and the like that can be connected to MFP 100H. The setting information may also be stored in a storage server capable of communicating with MFP 100H. Furthermore, as in the aforementioned embodiments, MFP 100H may be connected to management device 400 so as to transmit the identification information and the print-related information to server 300 directly from management device 400 or through MFP 100H.

According to image processing system SYS of one or more embodiments, the user does not have to execute the setting about permission of the notification for each MFP 100. Furthermore, the processing load applied to the slave units of MFP 100H such as MFP 100A to MFP 100C can be reduced.

According to one or more embodiments, an image processing system is provided. The image processing system includes: an image former that forms an image based on a print job; a terminal capable of transmitting the print job; a server that sends a push notification to the terminal based on identification information allowing identification of the terminal; a memory for storing the identification information and terminal information of the terminal in association with each other when the identification information of the terminal is generated based on permission of a push notification to the terminal; an extractor that, upon reception of the print job transmitted from the terminal, extracts the terminal information of the terminal from received data of the print job; a designator that designates the identification information associated with the terminal information from information stored in the memory based on the terminal information extracted by the extractor; a generator that generates information about a print setting screen of the image former based on the print job; and a notifier that performs a process for sending a push notification of the information about the print setting screen from the server to the terminal associated with the identification information based on the information about the print setting screen generated by the generator and the identification information designated by the designator.

According to one or more embodiments, the memory stores a plurality of pieces of terminal information for each user, and each of the plurality of pieces of terminal information is stored in association with a corresponding one of a plurality of pieces of identification information.

According to one or more embodiments, the memory stores the terminal information and the identification information in association with each other for each user, and stores identical terminal information for a plurality of users.

According to one or more embodiments, the print setting screen includes a preview screen of an image formed based on the print job.

According to one or more embodiments, the print setting screen includes a setting change screen used when print setting is changed through the terminal.

According to one or more embodiments, the image processing system further includes a register that registers setting information about print setting included in the print job as an initial value displayed on the setting change screen.

According to one or more embodiments, the image processing system further includes a prohibitor that prohibits setting about a setting item set by the print job from being changed through the setting change screen.

According to one or more embodiments, the image processing system further includes a register that registers an initial value that is set in advance as an initial value displayed on the setting change screen without registering setting information about print setting included in the print job as an initial value displayed on the setting change screen.

According to one or more embodiments, the print setting screen includes a preview screen of an image formed based on the print job and a setting change screen used when print setting is changed through the terminal.

According to another example of one or more embodiments, an image forming apparatus. The image forming apparatus includes: a receiver that receives a print job transmitted from a terminal; an image former that forms an image based on the print job; an extractor that, when the receiver receives the print job transmitted from the terminal, extracts terminal information about the terminal from received data of the print job; a memory for storing identification information allowing identification of the terminal and the terminal information of the terminal in association with each other, the identification information being generated based on permission of a push notification from a server to the terminal; a designator that designates the identification information associated with the terminal information from information stored in the memory based on the terminal information extracted by the extractor; a generator that generates information about a print setting screen of the image former based on the print job; and an instructor that instructs the server to send a push notification of the information about the print setting screen generated by the generator to the terminal associated with the identification information designated by the designator.

According to another example of one or more embodiments, a non-transitory computer-readable storage medium storing a program that can be read by an image forming apparatus capable of communicating with a terminal is provided. The program causes the image forming apparatus to: cause a memory to store identification information allowing identification of the terminal and terminal information about the terminal in association with each other, the identification information being generated based on permission of a push notification from a server to the terminal; upon reception of a print job transmitted from the terminal, extract the terminal information of the terminal from received data of the print job; designate the identification information associated with the terminal information from information stored in the memory based on the extracted terminal information; generate information about a print setting screen based on the print job; and instruct the server to send a push notification of the generated information about the print setting screen to the terminal associated with the designated identification information.

According to another example of one or more embodiments, a method executed in an image forming apparatus capable of communicating with a terminal is provided. The method includes: causing a memory to store identification information allowing identification of the terminal and terminal information about the terminal in association with each other, the identification information being generated based on permission of a push notification from a server to the terminal; upon reception of a print job transmitted from the terminal, extracting the terminal information of the terminal from received data of the print job; designating the identification information associated with the terminal information from information stored in the memory based on the extracted terminal information; generating information about a print setting screen based on the print job; and instructing the server to send a push notification of the generated information about the print setting screen to the terminal associated with the designated identification information.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image processing system comprising:
    an image forming apparatus that forms an image based on a print job;
    a terminal capable of transmitting the print job;
    a server that, when the terminal permits a push notification from the server, generates identification information that identifies the terminal permitting the push notification, and sends the push notification to the terminal based on the identification information;
    a memory that, for each user account, stores:
        the identification information and terminal information of the terminal in association with each other, and
        notification setting information that indicates whether to perform a print preview; and
    a central processing unit (CPU) that:
        upon reception of the print job transmitted from the terminal, extracts the terminal information of the terminal from received data of the print job;
        designates the identification information associated with the extracted terminal information;
        generates print-related information including a uniform resource locator (URL) for accessing a print setting screen of the image forming apparatus based on the print job;
        sends, to the server, an instruction to send the push notification of the print-related information to the terminal associated with the identification information, wherein the instruction includes the designated identification information and the print-related information; and
        determines, by referring to the notification setting information, whether to display a preview screen of the image based on the print job to be formed by the image forming apparatus.

2. The image processing system according to claim 1, wherein the memory stores a plurality of pieces of the terminal information for each user, and each of the plurality of pieces of terminal information is stored in association with a corresponding one of a plurality of pieces of the identification information.

3. The image processing system according to claim 1, wherein the memory stores the terminal information and the identification information in association with each other for each user, and stores the same terminal information for a plurality of users.

4. The image processing system according to claim 1, wherein the print setting screen includes a setting change screen used when a print setting is changed through the terminal.

5. The image processing system according to claim 4, wherein the CPU further registers the notification setting information as an initial value displayed on the setting change screen, wherein the notification setting information further indicates whether to perform the print setting.

6. The image processing system according to claim 5, wherein the CPU further prohibits setting about a setting item set by the print job from being changed through the setting change screen.

7. The image processing system according to claim 4, wherein
    the CPU further registers an initial value set in advance as an initial value displayed on the setting change screen without registering the notification setting information as an initial value displayed on the setting change screen, and
    the notification setting information further indicates whether to perform the print setting.

8. The image processing system according to claim 1, wherein
    the notification setting information further indicates whether to perform the print setting specific to the image forming apparatus, and
    the CPU displays the print setting screen when determining, while referring to the notification setting information, that the print setting specific to the image forming apparatus is permitted to be performed.

9. An image forming apparatus comprising:
    a receiver that receives a print job transmitted from a terminal;
    an image forming apparatus that forms an image based on the print job;
    a central processing unit (CPU) that, when the receiver receives the print job transmitted from the terminal, extracts terminal information about the terminal from received data of the print job; and
    a memory that, for each user account, stores:
        identification information that is generated when the terminal permits a push notification from a server and identifies the terminal permitting the push notification;
        the terminal information of the terminal in association with the identification information; and
        notification setting information that indicates whether to perform a print preview, wherein
    the CPU further:
        designates the identification information associated with the extracted terminal information,
        generates print-related information about a print setting screen of the image forming apparatus based on the print job;
        sends, to the server, an instruction to send the push notification of the print-related information including a uniform resource locator (URL) for accessing the print setting screen to the terminal associated with the identification information, wherein the instruction includes the designated identification information and the print-related information; and determines, by referring to the notification setting information, whether to display a preview screen of the image based on the print job to be formed by the image forming apparatus.

10. The image forming apparatus according to claim 9, wherein the memory stores a plurality of pieces of the terminal information for each user, and each of the plurality of pieces of terminal information is stored in association with a corresponding one of a plurality of pieces of the identification information.

11. The image forming apparatus according to claim 9, wherein the memory stores the terminal information and the identification information in association with each other for each user, and stores the same terminal information for a plurality of users.

12. The image forming apparatus according to claim 9, wherein the print setting screen includes the preview screen.

13. The image forming apparatus according to claim 9, wherein the print setting screen includes a setting change screen used when a print setting is changed through the terminal.

14. The image forming apparatus according to claim 13, wherein the CPU further registers the notification setting information as an initial value displayed on the setting change screen, wherein the notification setting information further indicates whether to perform the print setting.

15. The image forming apparatus according to claim 14, wherein the CPU further prohibits setting about a setting item set by the print job from being changed through the setting change screen.

16. The image forming apparatus according to claim 13, wherein the CPU further registers an initial value set in advance as an initial value displayed on the setting change screen without registering the notification setting information as an initial value displayed on the setting change screen, wherein the notification setting information further indicates whether to perform the print setting.

17. The image forming apparatus according to claim 9, wherein the print setting screen includes:
the preview screen, and
a setting change screen used when a print setting is changed through the terminal.

18. The image forming apparatus according to claim 9, wherein
the notification setting information further indicates whether to perform the print setting specific to the image forming apparatus, and
the CPU displays the print setting screen when determining, while referring to the notification setting information, that the print setting specific to the image forming apparatus is permitted to be performed.

19. A non-transitory computer-readable storage medium storing a program read by an image forming apparatus capable of communicating with a terminal, the program causing the image forming apparatus to:
cause a memory to, for each user account, store:
identification information that is generated when the terminal permits a push notification from a server and identifies the terminal permitting the push notification;
terminal information about the terminal in association with the identification information; and
notification setting information that indicates whether to perform a print preview,
upon reception of a print job transmitted from the terminal, extract the terminal information of the terminal from received data of the print job;
designate the identification information associated with the terminal information from the information stored in the memory based on the extracted terminal information;
generate print-related information about a print setting screen based on the print job;
send, to the server, an instruction to send the push notification of the print-related information including a uniform resource locator (URL) for accessing the print setting screen to the terminal associated with the identification information, wherein the instruction includes the designated identification information and the print-related information; and
determine, by referring to the notification setting information, whether to display a preview screen of the image based on the print job to be formed by the image forming apparatus.

20. The non-transitory computer-readable storage medium according to claim 19, wherein
the notification setting information further indicates whether to perform the print setting specific to the image forming apparatus, and
the program further causes the image forming apparatus to display the print setting screen when determining, while referring to the notification setting information, that the print setting specific to the image forming apparatus is permitted to be performed.

\* \* \* \* \*